United States Patent [19]

Loyd

[11] Patent Number: 5,002,420
[45] Date of Patent: Mar. 26, 1991

[54] SWIVEL SNAP HOOK

[75] Inventor: Bruce L. Loyd, Lawrence, Kans.

[73] Assignee: Aeroquip Corporation, Jackson, Mich.

[21] Appl. No.: 363,917

[22] Filed: Jun. 9, 1989

[51] Int. Cl.$^5$ .......................... F16D 1/12; B66C 1/36
[52] U.S. Cl. ..................................... 403/165; 403/78; 294/82.11
[58] Field of Search .................. 403/164, 165, 78, 60, 403/59; 294/82.1, 82.11; 24/265 H, 235, 234; 59/95

[56] References Cited

U.S. PATENT DOCUMENTS

| | | | |
|---|---|---|---|
| 760,171 | 5/1904 | Atwell | 24/235 |
| 1,113,256 | 10/1914 | Smith | 403/164 X |
| 3,194,598 | 7/1965 | Goldfuss | 294/82.1 X |
| 4,102,295 | 7/1978 | Crook, Jr. et al. | 294/82.1 X |
| 4,708,382 | 11/1987 | LaCount | 403/78 X |
| 4,723,804 | 2/1988 | Gatens | 403/165 X |

FOREIGN PATENT DOCUMENTS 3235301 3/1984 Fed. Rep. of Germany ... 294/82.11

Primary Examiner—Peter M. Cuomo
Attorney, Agent, or Firm—Beaman & Beaman

[57] ABSTRACT

A swivel snap hook of low cost, high strength construction for bearing loads wherein all the primary components are constructed of a stamped material including a body having a hook opening formed thereon for receiving a load member and a pivotally mounted keeper located adjacent the hook opening movable between a latched position closing the hook opening and a load attachment bypass position. The other primary components include an anchor and a swivel for rotatably mounting the body to the anchor. The swivel also being of a stamped and formed construction.

6 Claims, 1 Drawing Sheet

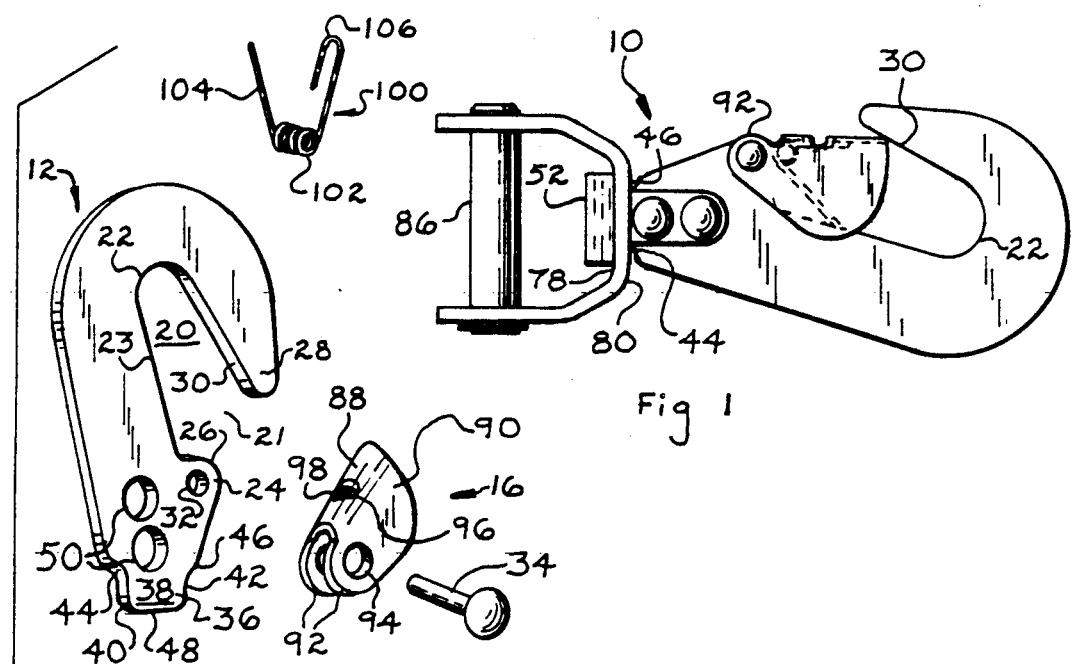
Fig 1
Fig 4
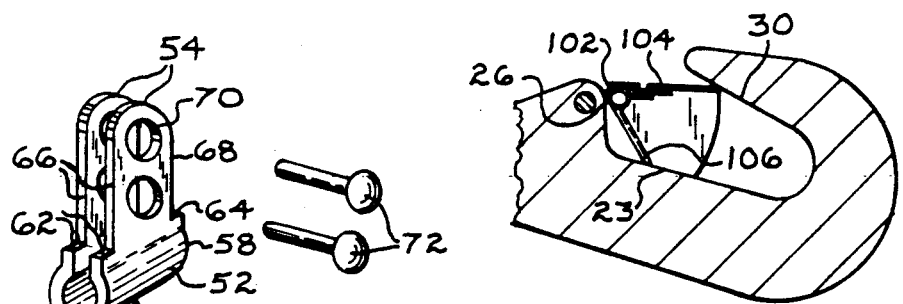
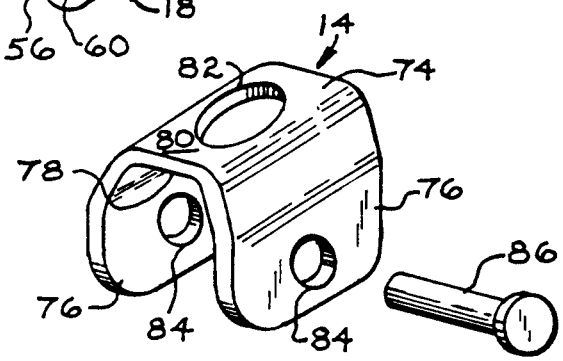
Fig 3
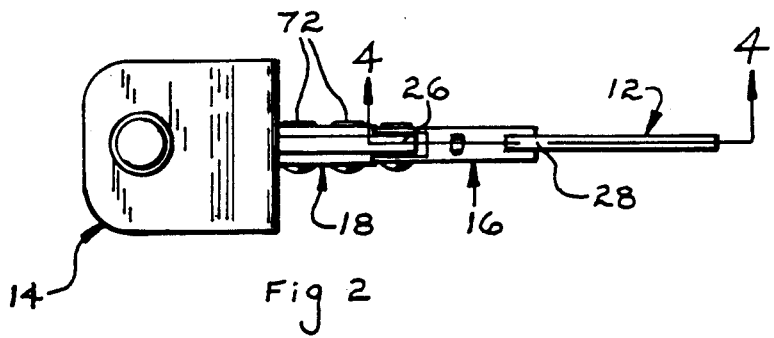
Fig 2

SWIVEL SNAP HOOK

BACKGROUND OF THE INVENTION

Snap hooks are commonly used for load carrying and other purposes wherein a web, chain, cable, or the like, may be attached to the snap hook for supporting the hook and the load suspended therefrom. Such snap hooks include a hook body having a hook opening defined thereon for receiving a load carrying cable, ring, or the like, and a keeper, usually spring biased, is located within the hook opening throat to prevent the load carrying cable from being accidentally removed from the hook opening.

Conventional snap hooks are usually constructed by a forged process and while such hooks have proven to function well and efficiently they are not of an economical manufacture. A more desirable snap hook would be one that is durable under heavy loading conditions and is of a more economical manufacture.

It is an object of the invention to provide a snap hook which is capable of bearing heavy loads wherein the snap hook is of an economical stamped construction.

A further object of the invention is to provide a swivel snap hook wherein the primary components include a hook body for bearing loads and a support base attachable to a tensioning member which are both formed of a stamped sheet material, and whereby the hook body is articulated with respect to the support base by a swivel formed by stamping and bending processes permitting swiveling of the hook body relative to the support base allowing the hook body to align itself with the direction of the tension forces imposed on the hook from the associated loads preventing bending or twisting of the hook.

In the practice of the invention the primary components of the snap hook are formed of stamped sheet metal and include a hook body, a pivotally mounted keeper, an anchor, and a swivel. The hook body is provided with a hook opening defined therein for receiving a load attachment member, and the pivotal keeper is pivotally mounted upon the hook body movable between a latched position closing the hook opening and a load attachment bypass position. Spring means bias the keeper toward the latched position. The load attachment member, such as a load ring, may be easily slipped past the keeper by engaging the keeper and pivoting the same from the hook opening in the conventional manner known in the snap hook art.

The anchor is provided with a bore, and the swivel includes a portion which is passed freely through the bore and is mounted to an extended portion defined on the hook body to swivelably mount the hook body to the anchor. Attachment means defined on the anchor are receivable by a web, chain, or the like, for supporting the snap hook and the load suspended therefrom. All the primary components in accord with the invention are formed of plate and sheet material which is readily fabricated by stamping and bending operations, thereby providing an easily assembled swivel snap hook of an economical, high strength construction.

BRIEF DESCRIPTION OF THE DRAWINGS

The aforementioned objects and advantages of the invention will be appreciated from the following description and accompanying drawings wherein:

FIG. 1 is a plan view of a swivel snap hook in accord with the invention,

FIG. 2 is a side view of the swivel snap hook of FIG. 1 as taken from the top of FIG. 1, FIG. 3 is an exploded perspective view of the swivel snap hook of FIG. 1, and FIG. 4 is a sectional view as taken along section IV—IV of FIG. 2.

DESCRIPTION OF THE PREFERRED EMBODIMENT

A typical swivel snap hook in accord with the invention is disclosed in FIGS. 1-4. The primary components of the swivel snap hook 10 are illustrated in FIG. 3 wherein the hook body is indicated at 12, the anchor or saddle is indicated at 14, the pivotal keeper is indicated at 16, and the swivel is indicated at 18. The body 12 is provided with a hook opening for receiving a load attachment member and is swivelably mounted to the saddle 14 by the swivel 18. The saddle 14, which may be attached to a web, chain, or other tensioning member, supports the body 12 and the load which is suspended therefrom. All of the primary components of the swivel snap hook 10 are of a economical stamped construction and are assembled in a manner later described.

The body 12 is stamped from a sheet of steel material and is provided with a notch or hook opening 20 which is inclined in a vertical manner having a throat 21, a load bearing surface 22 and an edge 23. The load attachment member, not shown, may be in the form of a cable loop, chain link, ring or the like and is supported on the load bearing surface 22 in the known manner. A shoulder 24 is formed on the body 12 and includes a curved edge 26 which defines one side of the throat opening 21, and a nose 28 includes an edge 30 which defines the other side. The shoulder 24 is also provided with a bore 32 for receiving a rivet 34 which functions as a pivot for the keeper 16 used for closing the throat opening 21.

A projection 36 is also formed on the body 12 and includes surfaces 38 having edges adjacent parallel edges 40 and 42. The edges 40 and 42 transversely extend from abutment edges 44 and 46, respectively, also defined on the body 12, and terminate on a transverse edge 48. The projection 36 is of sufficient width, as defined by the edges 40 and 42, to be freely received within a hole formed on the saddle 14. The body 12 is also provided with bores 50 which receive rivets for mounting the swivel 18 to the body 12.

The swivel 18 is of a generally U shaped configuration as best appreciated in FIG. 3, and the swivel 18 includes an elongated arcuate convex base 52 interconnected by substantially parallel leg portions 54 which are appropriately spaced to receive the projection surfaces 38. The base 52 has curved edges 56 and 58 defining an opening 60, and the edges 56 and 58 terminate at transverse abutment edges 62 and 64, respectively. The leg portions 54 are located intermediate the edges 56 and 58 and include edges 66 and 68 which transversely extend from the abutment edges 62 and 64, respectively. Both of the leg portions 54 are provided with bores 70 which align with the bores 50 of the body 12 to receive rivets 72 for mounting the keeper 18 to the body. The swivel 18 is formed by stamping the body from sheet metal and is shaped into the U configuration by bending.

The saddle 14 is also stamped from a steel plate and is formed into a U configuration by bending as appreciated from FIG. 3. The saddle 14 includes a flat portion 74 interconnected by substantially parallel leg portions 76. The flat portion 74 includes an inner surface 78, an outer surface 80, and a bore 82 extending therebetween. The diameter of the bore 82 is substantially greater than the width of the keeper leg portions 54 as defined by the edges 66 and 68, for freely receiving the legs, but is less than the length of the swivel base 52 as defined by the edges 56 and 58. Each of the leg portions 76 are provided with a bore 84 to receive a support member attachment pin 86. A tensioning member, not shown, is usually attached to the pin 86 for supporting the hook 10 and the associated load.

The pivotal keeper 16 is stamped from sheet material and formed into a generally U shaped configuration by bending. The keeper 16 includes a generally flat surface 88 interconnected by substantially parallel leg portions 90. The leg portions 90 each include an extension 92 which are appropriately spaced to receive the body shoulder 24 and each extension is provided with a bore 94 which aligns with the bore 32 to receive the rivet 34 to pivotally mount the keeper to the body 12. A bridge 96 is lanced in the flat surface 88 defining an opening 98. The keeper 16 is movable between a latched position closing the throat opening 21 and a load attachment bypass position, and is normally biased to the latched position by a spring 100, where the keeper surface 88 engages the nose edge 30, FIGS. 1, 2, and 4.

The spring 100 includes a coil 102, a straight tail 104 and a curved tail 106. Thus, it will be appreciated that the straight tail 104 will pass through the opening 98 and the coil 102 and the curved tail 106 will be located between the legs 90 as will be appreciated from FIGS. 1 and 4.

To assemble the swivel snap hook 10 of FIG. 3, the straight tail 104 is passed through the keeper opening 98 and the keeper 16 is located on the body 12 such that the shoulder 24 is received between the extensions 92, the surface 88 engages the nose edge 30 and the bores 32 and 94 of the body and keeper align to receive the rivet 34 which pivotally mounts the keeper 16 to the body 12, FIGS. 1, 2 and 4. The spring 100 is maintained between the legs 90 by the engagement of the coil 102 with the edge 26 and the engagement of the curved tail 106 with the edge 23, FIG. 4.

The leg portions 54 of the swivel 18 are passed through the saddle bore 82 until the abutment edges 62 and 64 engage the saddle inner surface 78, in which case the legs 54 protrude past the saddle outer surface 80. The projection 36 is inserted between the protruding legs 54 such that the end 48 of the projection 36 is located within the opening 60 and the bores 70 and 50 of the swivel and the body align to receive the rivets 72 for rigidly mounting the keeper to the body, FIGS. 1 and 2. The insertion of the pin 86 through the bores 84 completes the assembly.

When fully assembled, the fact that the diameter of the bore 82 is substantially greater than the width of the legs 54 permits swiveling of the body 12 with respect to the saddle 14 while the body abutment edges 44 and 46 form an abutting relationship with the saddle outer surface 80 and likewise the keeper abutment edges 62 and 64 with the saddle inner surface 78 to prevent separation of the body from the saddle.

In use, a tensioning member, not shown, is attached to the pin 86 for supporting the snap hook 10 and a load ring, not shown, may be received through the throat opening 21 and supported on the load bearing surface by displacing the keeper 16 in the conventional manner well known in the snap hook art. The swiveling relation of the body and the saddle allows the body to align with the direction of forces imposed on the hook 10 from the associated loads to prevent the body from bending or twisting.

The fact that all the major components of the swivel snap hook 10 are of a stamped fabrication and the keeper 16, swivel 18 and anchor 14 are final shaped by bending provides for a swivel snap hook of economical manufacture and dependable operation.

It is appreciated that various modifications to the inventive concepts may be apparent to those skilled in the art without departing from the spirit and scope of the invention.

I claim:

1. A swivel hook for lifting loads characterized by its economical, high strength construction wherein the basic components are formed of stamped sheet metal comprising, in combination, a body of sheet metal having a hook opening formed thereon for receiving a load attachment member, a swivel formed of folded sheet metal having a stem defined by a pair of spaced legs and an enlarged head, and an anchor formed of sheet metal having support attachment means for receiving a tensioning member, said anchor having a generally flat portion including an inner side and an outer side having a bore extending therethrough, said swivel stem extending through said anchor bore whereby said enlarged head forms an abutting relation with said anchor inner side, fasteners connecting said swivel stem to said body whereby said swivel permits rotation of said body with respect to said anchor.

2. In a swivel hook as in claim 1, said swivel, said generally U shaped configuration including an arcuate base having a pair of spaced legs extending therefrom, said arcuate base defining said enlarged head and said legs defining said stem and extending loosely through said bore whereby said body is received between said legs and said fasteners extend through said legs and body.

3. In a swivel hook as in claim 1, said anchor having a generally saddle shaped configuration including a flat base interconnected by a pair of legs extending transversely to the plane of the said flat base, said flat base defining said flat portion and each of said legs being provided with bore for receiving said support attachment means.

4. In a swivel hook as in claim 3, said support attachment means comprising a pin passing through said bores, said pin being headed at each end forming a head of a larger diameter than the diameter of said bores preventing separation of said pin from said bores.

5. In a swivel hook as in claim 1, a keeper pivotally mounted on said body adjacent said hook opening, said keeper being formed of stamped sheet metal and bent into a U configuration straddling said body and being selectively movable between a latched position closing said hook opening and load attachment member bypass position.

6. A swivel hook for lifting loads characterized by its economical, high strength construction wherein the basic components are formed of stamped sheet metal comprising, in combination, a body having a hook opening formed thereon for receiving a load attachment member, a swivel having a stem and an enlarged head, and an anchor having support attachment means for receiving a tensioning member, said body, swivel and anchor all being formed of stamped sheet metal, said anchor having a generally flat portion including an inner side and an outer side having a bore extending therethrough, said swivel stem extending through said anchor bore whereby said enlarged head forms an abutting relation with said anchor inner side, fasteners connecting said swivel stem to said body whereby said swivel permits rotation of said body with respect to said anchor, said body including a neck, transverse abutment shoulders defined adjacent said neck, said neck extending into said anchor bore, said abutment shoulders being adapted to engage said anchor outer side whereby said shoulders and swivel head limit axial displacement of said body relative to said anchor with respect to the axis of swivel rotation.

* * * * *

UNITED STATES PATENT OFFICE
CERTIFICATE OF CORRECTION

Patent No. 5,002,420          Dated March 26, 1991

Inventor(s) Bruce L. Loyd

It is certified that error appears in the above-identified patent and that said Letters Patent is hereby corrected as shown below:

Column 4, line 33, delete ", said" and substitute -- having a --.

Column 4, line 35, delete "having a" and substitute -- , said --.

Column 4, line 46, after "with" insert -- a --.

Signed and Sealed this

Fourteenth Day of July, 1992

Attest:

DOUGLAS B. COMER

Attesting Officer

Acting Commissioner of Patents and Trademarks